UNITED STATES PATENT OFFICE.

OSCAR OLSEN, OF OAKLAND, CALIFORNIA.

BURNED SHALE AND METHOD OF PREPARING THE SAME, AND CONCRETE MADE THEREFROM.

1,314,752.     Specification of Letters Patent.     Patented Sept. 2, 1919.

No Drawing.     Application filed May 22, 1918. Serial No. 235,938.

*To all whom it may concern:*

Be it known that I, OSCAR OLSEN, a citizen of the United States, and a resident of Oakland, county of Alameda, and State of California, have invented a new and useful Burned Shale and Method of Preparing the Same, and Concrete Made Therefrom, of which the following is a specification.

My invention relates to a new material having a very large variety of uses. In its chief use it may be classified as a building and construction material. Another important use is as a refining or purifying material.

An object of the invention is to provide a relatively light chemically inert, porous material useful in the refining of sugar or oil.

Another object of the invention is to provide a light, inert material highly resistant to stresses to take the place of the usual sand and crushed rock in concrete.

Another object of the invention is to provide a concrete having a high elastic limit or coefficient of elasticity, and a high ultimate compressive strength.

The invention possesses other features of advantage, some of which, with the foregoing, will be set forth in the following description of the preferred form of my invention. It is to be understood that I may adopt variations of the preferred form within the scope of my invention as set forth in the claims.

In the practice of my invention I take shale rock which has preferably been decomposed by the action of the elements and burn it in a kiln or otherwise subject it to a temperature of 2000 degrees Fahrenheit or above for a period determined by the nature of the rock, so that all organic matter therein is destroyed and it is reduced to a light porous, hard material. Shales vary widely in their chemical composition, usually containing in varying proportions dioxids of silicon and carbon, and oxids of aluminum, manganese and calcium, together with other substances in small and varying amounts. I do not know the exact composition of the shale after it has been burned, but have found that it is inert chemically in the presence of air, water, sea water and many other substances, and that it is a dead material, that is, there are no latent possibilities of chemical reaction within the substance itself.

After burning the shale, the resultant pieces are crushed and graded. The very fine material is a superior refining agent in the refining of sugar and oil, and for this purpose displaces the commonly used fuller's earth. The larger pieces of the material I substitute for crushed rock in the preparation of concrete, the finer particles being substituted for sand in the mixture.

The proportions of coarse and fine material in the concrete mixture of my invention will vary according to the nature of the work, but for ordinary construction, the following proportions give satisfactory results.

4 parts of burned shale coarsely crushed in place of the usual rock, 2 parts burned shale finely crushed in place of the usual sand, 1 part of Portland cement, and sufficient water which has been preferably boiled and cooled and is free from salt or alkali. By the addition of 10% magnesia cement to the Portland cement in the above mixture a concrete is produced which has a hard smooth surface capable of taking a polish. It is therefore suitable for floors or imitation marble work, or for other ornamental uses. The magnesia cement also adds to the strength of the concrete. The above proportions may be altered, or other ingredients may be added, such as Keen's cement, plaster of Paris, or lime, to produce a superior hard wall plaster or mortar for tiling, or for casting or ornamental work.

Concrete made according to the 4—2—1 formula first above given and preferably with magnesia cement forming 10% of the cement content will weigh from 80 to 84 pounds per cubic foot. It will resist a temperature of 3,800 degrees F. without injury and is therefore absolutely fireproof. It is a non-conductor of electricity and of heat, and excellent sound-proofing material and is unaffected by the elements, or salt water. One of the most valuable of its properties is its high elastic limit, which especially adapts it for use in ship construction. Its light weight and its great tensile and compressive strength are additional qualities which adapt it for such use. Compared with ordinary concrete made of sand and rock, my concrete requires less than half the amount of reinforcement, and has about four times the compressive strength.

If a spike or nail is driven into a wall formed of my concrete within several weeks after erection, the nail or spike will bed firmly therein as though in wood. Because of its elastic qualities, great strength and light weight, it is, among many other uses, particularly suitable for telephone poles, posts. piles for all purposes and especially marine work. barges and ships, railroad ties, mining timbers, bridges, buildings and floors.

In the term magnesia cement I include the well known article of commerce composed largely of magnesium chlorid and magnesium oxid, and also cement made from burned magnesite which may be largely magnesium oxid.

I claim:

1. A composition of matter comprising a mixture of coarse and fine pieces of shale rock which have been burned but not clinkered.

2. The method of making concrete which consists in burning without clinkering shale rock, crushing the burnt material into fine and coarse pieces, and mixing a mixture of said fine and coarse pieces with a binding material.

3. An article of manufacture comprising naturally decomposed shale rock which has been burned but not clinkered.

4. The method of preparing shale rock for use as an aggregate which consists in burning the rock, crushing it, and treating the crushed and burned material to eliminate the pulverulent particles.

5. Concrete comprising as an ingredient naturally decomposed shale rock which has been burned but not clinkered.

6. A concrete comprising Portland cement and an aggregate consisting entirely of finely crushed burned shale rock and coarsely crushed burned shale rock.

7. A concrete comprising burned shale rock Portland cement, and magnesia cement.

8. A concrete comprising coarsely crushed burned shale rock, finely crushed burned shale rock, Portland cement, and magnesia cement.

9. A concrete comprising ingredients in the following proportions: coarsely crushed burned shale rock 4 parts, finely crushed burned shale rock 2 parts, and 1 part of cement composed of 90% Portland cement and 10% magnesia cement.

10. The method of making concrete which consists in burning shale rock, crushing the burnt material into fine and coarse pieces, and mixing a mixture of said fine and coarse pieces with a binding material and water.

11. A concrete comprising a binding material and an aggregate consisting entirely of finely crushed burned shale rock and coarsely crushed burned shale rock.

12. The method of making concrete which consists in burning shale rock and mixing the burned material with Portland cement, magnesia cement and water.

In testimony whereof, I have hereunto set my hand at Oakland, California, this 17th day of May, 1918.

OSCAR OLSEN.

In presence of—
C. S. EVANS.